US006201060B1

(12) United States Patent
Jansen et al.

(10) Patent No.: US 6,201,060 B1
(45) Date of Patent: Mar. 13, 2001

(54) WATER DISPERSABLE, ISOCYANATES WITH ENHANCED ABSORBING CAPACITY AS PAPER AUXILIARY AGENTS

(75) Inventors: Bernhard Jansen, Köln; Bernd Thiele, Odenthal; Thomas Roick; Johan Kijlstra, both of Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/269,460

(22) PCT Filed: Sep. 17, 1997

(86) PCT No.: PCT/EP97/05087

§ 371 Date: Mar. 26, 1999

§ 102(e) Date: Mar. 26, 1999

(87) PCT Pub. No.: WO98/14495

PCT Pub. Date: Apr. 9, 1998

(30) Foreign Application Priority Data

Sep. 30, 1996 (DE) .............................. 196 40 205

(51) Int. Cl.$^7$ ................ C08J 3/00; C08K 3/20; C08L 75/00; C08G 18/00; D21H 11/00
(52) U.S. Cl. ............. 524/590; 162/164.6; 524/591; 524/839; 524/940; 528/44; 528/65; 528/85
(58) Field of Search ................. 524/590, 591, 524/839, 840; 528/44, 65, 85; 162/164.6

(56) References Cited

U.S. PATENT DOCUMENTS

| 4,663,377 | 5/1987 | Hombach et al. .................. 524/196 |
| 4,960,772 | 10/1990 | Sebag et al. ....................... 514/231.2 |
| 5,459,197 | 10/1995 | Schwindt et al. .................... 524/591 |
| 5,503,714 | 4/1996 | Reiners et al. ..................... 162/164.6 |
| 5,696,291 | * 12/1997 | Bechara et al. ...................... 564/292 |
| 5,718,804 | 2/1998 | Jansen et la. ...................... 162/164.6 |
| 5,739,249 | 4/1998 | Reiners et al. ........................ 528/44 |

FOREIGN PATENT DOCUMENTS

| 1228807 | 11/1987 | (BE) . |
| 2093289 | 10/1993 | (BE) . |
| 2208421 | 7/1996 | (BE) . |
| 4419572 | 11/1995 | (DE) . |
| 013112 | 7/1980 | (EP) . |

* cited by examiner

Primary Examiner—Patrick D. Niland
(74) Attorney, Agent, or Firm—Joseph C. Gil; Richard E. L. Henderson

(57) ABSTRACT

The present invention relates to water-dispersible polyisocyanates obtained by reacting a) at least one polyisocyanate,
b) at least one polyalkylene oxide polyether alcohol optionally containing ester groups,
c) at least one quatemized tertiary aminopolyethylene oxide polyether alcohol, and
d) optionally, further auxiliaries and additives.

11 Claims, No Drawings

WATER DISPERSABLE, ISOCYANATES WITH ENHANCED ABSORBING CAPACITY AS PAPER AUXILIARY AGENTS

The invention relates to water-dispersible polyisocyanates and their preparation and use.

DE-A 4 211 480 discloses a process for wet strength treatment of paper with the aid of water-dispersible polyisocyanate mixtures which comprise 2 to 20% by weight of ethylene oxide units arranged in the form of polyether chains, these chains containing a random average of 5 to 70 ethylene oxide units. EP-A 0 582 166 describes the use of polyisocyanates containing tertiary amino groups and/or ammonium groups and 0 30% by weight (based on the mixture) of ethylene oxide units in the form of polyether chains, with the aim of producing cellulosic materials which have been given a dry strength and wet strength treatment and/or have been sized. In Example 20, the use of methylated dimethylaminoethanol is described. DE-A 4 436 058 provides information on a process for the preparation of cellulosic materials which have been given a dry strength and/or wet strength treatment, using water-dispersible polyisocyanates with an increased polyether content.

DE-A 4 446 334.0 describes a process for the preparation of paper which is easier to repulp, using or co-using isocyanates containing ester or amide structures.

In view of the increased requirements, effective paper auxiliaries should be provided in a simplified preparation.

The invention relates to water-dispersible polyisocyanates P obtainable by reaction of the following starting components:

a) at least one polyisocyanate a), b) at least one polyalkylene oxide polyether alcohol b) optionally containing ester groups and c) at least one quaternized tertiary aminopolyalkylene oxide polyether alcohol, preferably of the structure (I)

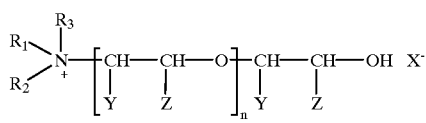
(I)

wherein:

n denotes an integer from 2 to 60, $R_1$ and $R_2$ are identical or different and denote an alkyl radical having 2 to 7 C atoms, or together, optionally including $R_3$, denote the radical of a heterocyclic ring, in particular morpholine, $R_3$ denotes an alkyl radical having 1 to 7 C atoms, X denotes an anion customary in isocyanate chemistry, in particular

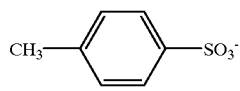

Y and Z denote hydrogen or methyl, with the proviso that always at least one of the two represents hydrogen, it being possible for the recurring units

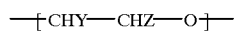

in each case to be identical or different from one another, d) optionally further auxiliaries and additives.

The term "water-dispersible" in connection with polyisocyanates P according to the invention means that they are polyisocyanates which, in a concentration of 70% by weight, preferably up to 50% by weight, in water, give finely divided dispersions with particle sizes of less than 500 nm.

In a preferred embodiment, polyisocyanate a) is a modified polyisocyanate.

The term "modified" in connection with the polyisocyanates means generally that they are secondary products, which are known per se, of diisocyanates which are known per se and preferably have at least one of the structural elements mentioned below.

Modified polyisocyanates a) which can be used are: aliphatic, cycloaliphatic, araliphatic or aromatic isocyanates with an NCO functionality of 1.8 to 4.2. Polyisocyanates which contain uretdione and/or isocyanurate and/or allophanate and/or biuret and/or oxadiazine structures and which are accessible in a known manner from aliphatic, cycloaliphatic, araliphatic or aromatic diisocyanates are preferably used.

These are preferably essentially polyisocyanate mixtures which have an NCO content of 19 to 24% by weight, comprise trimeric 1,6-diisocyanatohexane or 1-isocyanato-3,3,5-trimethyl-5-isocyanatomethyl-cyclohexane and the corresponding higher homologues, and contain isocyanurate groups and optionally uretdione groups. The corresponding polyisocyanates of the NCO content mentioned, which are largely free from uretdione groups and contain isocyanate groups, are obtained by catalytic trimerization, which is known per se, of 1,6-diisocyanatohexane or 1-isocyanato-3,3,5-trimethyl-5-isocyanatomethyl-cyclohexane, with formation of isocyanurate, and preferably have an (average) NCO functionality of 3.2 to 4.2 are particularly preferred. The trimeric polyisocyanates which have an NCO content of 19 to 25% by weight, are obtained by reaction of 1,6-diisocyanatohexane with less than the equivalent amount of water in a known manner and essentially contain biuret groups are also preferred.

The polyisocyanates described in DE-A 4 446 334 in claims 1,2,3,7 and 8 can likewise be employed as modified polyisocyanate a). Particularly preferred polyisocyanates of this type have the formulae (II) and (III) given in DE-A 4 446 334.

Preferred polyisocyanates a) correspond to the following formula (II)

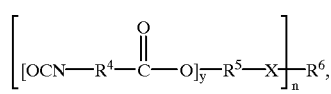
(II)

in which:

$R^4$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms or an araliphatic hydrocarbon radical having 8 to 15 carbon atoms, $R^5$ denotes an aliphatic hydrocarbon radical which optionally contains double bonds and has 10 to 35 carbon atoms, $R^6$ denotes an at least divalent hydrocarbon radical, which can also optionally be heterocyclic, including the ester oxygen or amide nitrogen from X, X denotes

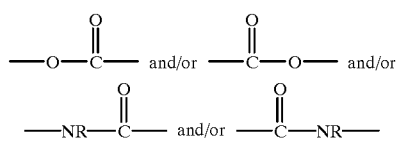

where R=H or $C_1$–$C_4$-alkyl or a constituent of a cyclic structure, n denotes a number, at least 2, and y denotes a number, at least 1, either by themselves or as a mixture with isocyanates which do not contain ester and/or amide groups.

Polyalkylene oxide polyether alcohols b) which optionally contain ester groups are mono- or polyhydric polyalkylene oxide polyether alcohols containing a random average of 2 to 70, preferably 2 to 60 ethylene oxide units per molecule, such as are accessible in a manner known per se by alkoxylation of suitable starter molecules. To prepare these polyalkylene oxide polyether alcohols, any desired mono- or polyhydric alcohols of the molecular weight range 32 to 150 g/mol, such as are also used, for example, according to EP-A 0 206 059, can be employed as starter molecules. Monofunctional aliphatic alcohols having 1 to 4 carbon atoms are preferably used as starter molecules. The use of methanol or ethylene glycol monomethyl ether is particularly preferred. Alkylene oxides which are suitable for the alkoxylation reaction are, in particular, ethylene oxide and propylene oxide, which can be employed in the alkoxylation reaction in any desired sequence or also as a mixture.

The polyalkylene oxide polyether alcohols are preferably pure polyethylene oxide polyethers or mixed polyalkylene oxide polyethers which contain at least one polyether sequence which has at least 2, in general 2 to 70, preferably 2 to 60, and particularly preferably 2 to 50 ethylene oxide units, the alkylene oxide units of which consist of ethylene oxide units to the extent of at least 60 mol %, preferably to the extent of at least 70 mol %. Preferred such polyalkylene oxide polyether alcohols are monofunctional polyalkylene oxide polyethers which are started from an aliphatic alcohol containing 1 to 4 carbon atoms and contain a random average of 2 to 60 ethylene oxide units. Particularly preferred polyalkylene oxide polyether alcohols are pure polyethylene glycol monomethyl ether alcohols which contain a random average of 2 to 40 ethylene oxide units.

Suitable polyalkylene oxide polyethers containing ester groups are OH-terminated polyester ethers which are obtainable by reaction of aliphatic $C_2$–$C_8$-dicarboxylic acids or esters or acid chlorides thereof with polyethers from the group consisting of polyethylene oxides, polypropylene oxides or mixtures thereof or mixed polyethers therefrom, 0.8 to 0.99 equivalent of carboxyl groups or derivatives thereof being employed per OH equivalent of the polyether, and have an average molecular weight of less than 10,000 g/mol, preferably less than 3000 g/mol, and have hydroxyl end groups.

Quaternized aminopolyalkylene oxide polyether alcohols are known per se from EP-A-109 354 and EP-A-335 115.

The quaternized tertiary aminopolyalkylene oxide polyether alcohols I are preferably prepared by using alcohols of the molecular weight range of up to 150 g/mol containing at least one tertiary amino group as starter molecules. Aliphatic alcohols having up to 10 carbon atoms and containing at least one tertiary amino group are preferably used as starter molecules. Monofunctional aliphatic tertiary amino alcohols having up to 10 carbon atoms are particularly preferred as starter molecules. The quaternization of the tertiary amino function can be carried out both before the alkoxylation of the starter and after alkoxylation thereof.

The alkylation is carried out by processes of the prior art which are known per se, using known alkylating agents. Examples which may be mentioned here are dialkyl sulphates, alkyl chorides, alkyl iodides, alkyl bromides, alkyl toluenesulphonates and alkyl trifluoromethylsulphonates. Alkylating agents with an alkyl radical of one to seven carbon atoms are preferred. Methyl compounds, in particular methyl chloride, dimethyl sulphate, methyl toluenesulphonate and methyl trifluoromethylsulphonate, are particularly preferred.

Alkylene oxides which are suitable for the alkoxylation reaction are, in particular, ethylene oxide and propylene oxide, which can be employed in the alkoxylation reaction in any desired sequence or also as a mixture.

The abovementioned polyalkylene oxide polyether alcohols started from alcohols containing tertiary amino groups or the quaternized form are preferably pure polyethylene oxide polyethers or mixed polyalkylene oxide polyethers which contain at least one polyether sequence which has at least 2, in general 2 to 70, preferably 2 to 60, particularly preferably 2 to 50, ethylene oxide units, the alkylene oxide units of which consist of ethylene oxide units to the extent of at least 60 mol %, preferably to the extent of at least 70 mol %.

Preferred such polyalkylene oxide polyether alcohols are monofunctional polyalkylene oxide polyethers which are started from an aliphatic alcohol containing tertiary amino groups or the quaternized form thereof and having up to 10 carbon atoms and which contain a statistical average of 2 to 60 ethylene oxide units.

These polyethers can of course also contain ester groups.

The auxiliaries and additives d) optionally present are, for example, catalysts or stabilizers which are known per se in polyurethane chemistry for the water-dispersible isocyanates.

Polyisocyanates P according to the invention can be prepared by reaction of the abovementioned components a) with c), optionally together with components b) and/or d). Preferred variants of the preparation are given below.

Polyisocyanates a) can be employed either separately or as a mixture also in combination with external ionic or nonionic emulsifiers. Such emulsifiers are described, for example, in Houben-Weyl, "Methoden der organischen Chemie" [Methods of Organic Chemistry], Thieme-Verlag, Stuttgart (1961), volume XIV/1, part 1, page 190 to 208, in U.S. Patent Specification 3 428 592 and in EP-A 0 013 112. The emulsifiers are employed in an amount which ensures dispersibility.

If polyisocyanates a) are first reacted with polyalkylene oxide polyether alcohols b) and quaternized tertiary aminopolyethylene oxide polyether alcohols c) in a manner known per se, an NCO/OH equivalent ratio of at least 2:1 (for example in general from 4:1 to about 1000:1) is preferably maintained, as a result of which polyether-modified polyisocyanates having an average NCO functionality of 1.8 to 4.2, preferably 2.0 to 4.0, a content of aliphatically or cycloaliphatically bonded isocyanate groups of 1.0 to 21.5% by weight and a content of ethylene oxide units arranged within polyether chains (calculated as $C_2H_4O$, molecular weight=44 g/mol) of 2 to 35% by weight are obtained.

The starting components are reacted in any desired sequence with the exclusion of moisture, preferably without a solvent. As the amount of alcohol component increases, the viscosity of the end product also increases, so that in certain cases (for example if the viscosity rises above 100 Pas) a solvent which is preferably miscible with water but inert towards the polyisocyanate can be added. Suitable solvents are:

alkyl ether acetates, glycol diethers, toluene, carboxylic acid esters, acetone, methyl ethyl ketone, tetrahydrofuran and dimethylformamide.

The reaction can be accelerated by catalysts which are known per se, such as dibutyltin dilaurate, tin(II) octoate or 1,4-diazabicyclo[2,2,2,]octane, in amounts of 10 to 1000 ppm, based on the reaction components. The reaction is carried out at temperatures up to 130° C., preferably at 10° C. to 100° C., particularly preferably at 20° C. to 80° C. The reaction can be monitored by titration of the NCO content or by evaluation of the NCO band of the IR spectrum at 2260 to 2275 $cm^{-1}$, and is ended when the isocyanate content is not more than 0.1% by weight above the value which corresponds to complete conversion. As a rule, reaction times of less than 24 hours are sufficient. Solvent-free synthesis is preferred.

Components a) to d) are preferably employed in the following amounts:

Component a): 45 to 90 parts, in particular 40 to 75 parts.
Component b): 2 to 40 parts, in particular 5 to 35 parts.
Component c): 0.5 to 20 parts, in particular 0.5 to 17 parts.
Component d): 0 to 1 part, in particular 1 to 7 parts,
where the sum of all the parts by weight is always 100.

The water-dispersible polyisocyanate mixtures P according to the invention are easy to handle industrially and are stable to storage for months with exclusion of moisture. They are preferably employed without organic solvents. They are very easy to emulsify in water at temperatures of up to 100° C. The active compound content of the emulsion can be up to 70% by weight. However, it is more advantageous to prepare emulsions having a content of active compound of 1 to 50% by weight, which can then be diluted further, if appropriate, before the metering point. The mixing units customary in the art (stirrers, mixers with the rotor-stator principle and, for example, high-pressure emulsifying machines) are suitable for the emulsification.

Preferred polyisocyanates P are self-emulsifying, that is to say after addition to the aqueous phase, they can easily be emulsified even without the action of high shearing forces. As a rule, a static mixer is sufficient. The emulsions obtained have a certain processing time, which depends on the structure of the polyisocyanates to be employed according to the invention, in particular on their content of basic N atoms. The processing time of such an aqueous emulsion is as a rule up to 24 hours. The processing time is defined as the time in which the optimum of the dry and wet strength action is achieved.

To facilitate incorporation into the aqueous phase, it may be expedient to employ the water-dispersible polyisocyanate mixture P as a solution in a solvent which is inert towards isocyanate groups. Suitable solvents are, for example, ethyl acetate, ethylene glycol diacetate, propylene glycol diacetate, 2-butanone, 1-methoxypropyl 2-acetate, toluene or mixtures thereof. The content of the solvent in the solution of the polyisocyanate should be no more than 80% by weight, preferably not more than 50% by weight. However, the use according to the invention of solvent-free, water-dispersible polyisocyanates is particularly preferred.

The invention furthermore relates to a process for the refinement of cellulosic, optionally wood-containing materials which have been obtained by refinement with a water-dispersible polyisocyanate P according to the invention and optionally have been further processed.

The invention furthermore relates to cellulosic, optionally wood-containing materials, characterized in that these materials are treated with a water-dispersible polyisocyanate P according to the invention.

The cellulosic materials suitable for the process according to the invention are, for example, paper or paper-like materials, such as pasteboard and card. The polyisocyanate mixtures preferred for the wet strength and dry strength treatment have an NCO functionality of greater than 2.

For the dry and wet strength treatment, the water-dispersible polyisocyanates P can be employed in the pulp, and are then preferably added directly to the cellulosic dispersion of the fibre raw materials. For this, polyisocyanate P is emulsified in water at 20 to 80° C. and the emulsion obtained as a result is added to a suspension of the fibre raw material, or dispersed directly in the suspension of the fibre materials. The paper is formed from this suspension by dewatering, and is then dried. For emulsification of polyisocyanate P, it is expedient to provide 1 to 4 times the amount of water. Higher amounts of water are also possible. For treatment of the surface, a finished base paper is treated with an emulsion of polyisocyanate P in water and then dried. Use in the sizing press is possible. In this case, polyisocyanate P, emulsified in water, is transferred to the finished paper web.

It is particularly preferable to meter the aqueous emulsion of polyisocyanates P into the fibre material in the course of 60 minutes, preferably in the course of 15 minutes. To achieve the optimum wet strength under conditions in practice, metering of the polyisocyanate, for example, shortly before the headbox of the papermaking machine, is recommended in particular. For testing, sheets of paper with a weight per unit area of 50 to 100 $g/m^2$ will in general be formed in the laboratory.

According to the invention, the products can be metered into the solid in the pulp in the pH range of 4 to 10, preferably 5.5 to 9. Use in the neutral pH range (pH 6 to 7.5) is particularly preferred. The cationic charge, which is independent of the pH, means that the absorption properties are also improved in the alkaline range, which is completely in contrast to the water-dispersible polyisocyanates containing only tertiary amino groups.

The amounts of water-dispersible polyisocyanate P to be employed according to the invention which are used depend on the required effect. As a rule, amounts used of 0.001 to 50% by weight, preferably 0.1 to 10% by weight, particularly preferably 0.1 to 2.0% by weight of active compound, based on the dry fibre raw material, are sufficient. The metering of the active substance, based on the fibre raw material, corresponds to that of known wet strength agents of the polyamidoamine-epichlorohydrin type.

Polyisocyanates P to be employed according to the invention give ready-to-use papers of good wet strength from the machine. An intensification of the wet strength effect can be achieved by storage of the finished paper and/or an after-condensation.

The dry strength is also improved compared with conventional dry-strength agents.

The process according to the invention for refinement is carried out under the processing temperatures customary in the paper industry. The processing time here depends on the temperature. In the temperature range from 20 to 25° C., the processing time is relatively long. After storage of the aqueous emulsion for 6 hours, the wet strength effect still achieves about 70% of the value from immediate use of the emulsion. At a higher temperature, for example at $_{50}$° C., processing within 6 hours is to be recommended. In contrast, the maximum wet strength effect surprisingly is scarcely dependent on the contact time with the cellulose. Papers which were formed immediately and after a contact time of 2 hours after addition of the water-dispersible polyisocyanate to the paper fibre material each show the same wet strength. The strength of the paper can be adjusted in the desired manner by suitable choice of the starting components. The process according to the invention is suitable not only for the production of papers with dry strength and wet strength, but also for the production of papers which are resistant to oil and petrol.

Water-dispersible polyisocyanates P can be employed in combination with other cationic auxiliaries, such as retention agents, fixing auxiliaries, drying auxiliaries and wet-strength agents. In particular, the fixing of fillers can be intensified further by addition of commercially available retention agents of the type of cationic polycondensates and addition polymers, for example polyamides, polyethyleneimines, polyamidoamines and polyacrylamides, and of dual systems comprising cationic or cationic and anionic and optionally particulate components, such as silica sols and the like.

This is of interest in particular if use in the laminated paper sector is intended. Preferred retention agents in the context of the invention are cationic polycondensates from polyamines, preferably with dichloroethane. However, it is to be emphasized that the desired wet strength effect can also be achieved without addition of particular fixing auxiliaries. The strength of the paper can be increased in particular by combination with polysaccharides, such as hydroxyethylcellulose, carboxymethylcellulose, starch, galactomannans or cationic derivatives thereof.

Polyisocyanates P to be employed according to the invention can of course optionally be employed together, that is to say simultaneously or successively, with the above-mentioned cationic auxiliaries. However, since many of the auxiliaries contain organically bonded halogen, combination with AOX-free and/or low-AOX auxiliaries is particularly preferred, since chlorine-free paper production is the chief aim.

All cellulosic, optionally wood-containing materials, such as paper, pasteboard or card, produced with the aid of water-dispersible polyisocyanates P according to the invention with co-use of the isocyanates containing ester and/or amide groups described in DE-A 4 446 334 can be repulped.

This repulping with the aim of reusing the fibre raw materials is possible in various ways:

a) By treatment with alkalis or acids, preferably with alkalis at slightly elevated temperature, for example 35 to 120° C., preferably 40 to 1 10° C., optionally co-using oxidizing agents, such as $H_2O_2$ or $K_2S_2O_8$.

b) By treatment with ozone.

c) By treatment with enzymes which cleave ester groups.

d) By treatment with microorganisms which cleave ester groups.

In the case of a cellulosic material with wet strength, these methods, which are known per se, lead to a loss in the wet strength and to the possibility of recovering the fibre raw materials by pulping the cellulosic materials.

Reactions a) to d) usually proceed very smoothly, but a general statement of reaction times is not possible, since these greatly depend on the degree of wet strength treatment and, for example, on the weight per unit area of the cellulosic materials to be repulped. Furthermore, with the aid of the water-dispersible polyisocyanates just described, either in bulk or in aqueous suspension, it is possible to prepare chemically or biologically degradable coating compositions, adhesives, binders or plastics.

The invention furthermore relates to quatemized tertiary aminopolyethylene oxide polyether alcohols c) of the above-mentioned structure I.

EXAMPLES

Comparison substance 1

A commercially available wet-strength agent based on an aqueous solution of a polyamidoamine-halogenohydrin reaction product.

Comparison substance 2

(Polyisocyanate of the prior art according to DE-A 4226110)

82 g of a polyisocyanate which is prepared by trimerization of some of the isocyanate groups of 1,6-diisocyanatohexane, contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3000 mPas (23° C.) are reacted with 17 g of a polyether which is started from 2-(2-methoxyethoxy)ethanol and is based on ethylene oxide, with a number-average molecular weight of 350 g/mol and a hydroxyl number of 160 mg of KOH/g, and 1 g of dimethylamninoethanol.

| | |
|---|---|
| NCO content: | 15.20% |
| Viscosity (23° C.): | 3500 mPas |

The water-dispersible isocyanate is diluted to a solids content of 80% with propylene glycol diacetate.

Compositions according to the invention

Water-dispersible polyisocyanates P according to the invention are prepared by reaction of the following components:

Component a):

A polyisocyanate which is prepared by trimerization of some of the isocyanate groups of 1,6-diisocyanatohexane, contains isocyanate groups, essentially comprises tri(6-isocyanatohexyl) isocyanurate and higher homologues thereof and has an NCO content of 21.4%, a content of monomeric 1,6-diisocyanatohexane of <0.3% and a viscosity of 3000 mPas (23° C.).

Component b):

200 g of refined castor oil (nOH =0.579 mol) are stirred together with 389 g of hexamethylene diisocyanate (nOH= 4.632 mol) at 80° C. until the isocyanate content has fallen to 28.3%. The excess isocyanate is then removed with the aid of a thin film evaporator; the isocyanate content is 7.9% (theoretical value 8.18%) and the viscosity is 4533 mPas.

Component c):

A polyether which is started from 2-(2-methoxy) ethoxyethanol and is based on ethylene oxide, having a number-average of-the-molecular weight of 350 g/mol and an OH number of 160 mg of KOH/g.

Component d):

A polyether which is started from morpholinoethanol and is based on ethylene oxide, with a number-average molecular weight of 428 g/mol and an OH number of 131 mg of KOH/g. This polyether is reacted with methyl toluenesulphonate in a stoichiometric ratio of 1:1. Its OH number is then 89 mg of KOH/g.

As described for comparison substance 1, components a) and b) were initially introduced in the ratios of amounts described in the following Table 1 and reacted with components c) and d) by reaction at 60° C.

The results of the wet breaking load are better the higher the value, while the values of the wet breaking load after NaOH treatment are better the lower the value. The last line of the table (% residual wet breaking load) is obtained from the two preceding lines, and the value is better the smaller it is.

TABLE 2

| Experiment | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Comparison substance 1 | 0.5 | | | | | | | | 1.0 | | | | | | | |
| Comparison substance 2 | | 0.5 | | | | | | | | 1.0 | | | | | | |
| Water-dispersible isocyanate 1 | | | 0.5 | | | | | | | | 1.0 | | | | | |
| Water-dispersible isocyanate 2 | | | | 0.5 | | | | | | | | 1.0 | | | | |
| Water-dispersible isocyanate 3 | | | | | 0.5 | | | | | | | | 1.0 | | | |
| Water-dispersible isocyanate 4 | | | | | | 0.5 | | | | | | | | 1.0 | | |
| Water-dispersible isocyanate 5 | | | | | | | 0.5 | | | | | | | | 1.0 | |
| Water-dispersible isocyanate 6 | | | | | | | | 0.5 | | | | | | | | 1.0 |
| Measurement values | | | | | | | | | | | | | | | | |
| Weight per unit area [g/m²] | 83.4 | 81.5 | 81.8 | 80.9 | 81.2 | 82.8 | 79.6 | 79.0 | 81.2 | 80.9 | 81.5 | 80.9 | 81.8 | 84.4 | 78.0 | 81.5 |
| Wet breaking load [N] | 16.9 | 11.3 | 16.9 | 16.9 | 16.0 | 7.7 | 21.1 | 20.1 | 22.5 | 15.5 | 25.4 | 24.4 | 25.4 | 21.5 | 23.8 | 22.3 |
| Wet breaking load after NaOH treatment* [N] | 9.0 | 11.2 | 9.3 | 9.4 | 7.5 | 1.0 | 7.1 | 4.6 | 13.2 | 14.4 | 16.9 | 18.5 | 12.4 | 1.9 | 8.7 | 6.2 |
| % Residual wet breaking load | 53.5 | 99.1 | 55.0 | 55.6 | 46.9 | 13.0 | 33.6 | 22.9 | 58.7 | 92.9 | 66.5 | 75.8 | 48.4 | 8.8 | 36.6 | 27.8 |

TABLE 1

| Isocyanate* | a) [parts by weight] | b) [parts by weight] | c) [parts by weight] | d) [parts by weight] |
|---|---|---|---|---|
| 1 (invention) | 30.2 | 45.3 | 18.1 | 6.4 |
| 2 (invention) | 37.8 | 37.8 | 18.1 | 6.4 |
| 3 (invention) | 22.6 | 52.9 | 18.1 | 6.4 |
| 4 (invention) | — | 75.5 | 18.1 | 6.4 |
| 5 (invention) | 15.1 | 60.4 | 18.1 | 6.4 |
| 6 (invention) | 11.3 | 64.2 | 18.1 | 6.4 |

*all the water-dispersible isocyanates also contained 0.05 part of dibutylphosphoric acid.

Production of paper and testing of the wet strength

A mixture of 80% of bleached pine sulphate cellulose and 20% of bleached birch sulphate cellulose is beaten at a pulp density of 2.5% in a hollander to a degree of freeness of 38° SR. 100 g portions of the resulting cellulose suspension are then diluted with water to a volume of 1000 ml in glass beakers.

0.5% by weight and 1.0% by weight, based on the cellulose, both of the comparison substances and of the water-dispersible isocyanates prepared are added, after prior dispersion in water (dispersion with 20% by weight of polyisocyanate), to the cellulose dispersions and these dispersions are stirred for a further 3 minutes after the addition.

Thereafter, sheets of paper with a weight per unit area of about 80 g/m² are formed with the contents of the glass beakers on a sheet-forming apparatus (Rapid-Kothen apparatus). The sheets of paper are dried at 85° C. for 8 minutes under a vacuum of 20 mm Hg and after-heated at 110° C. for a further 10 minutes. After climatic fixing, 5 test strips 1.5 cm wide are cut out of each sheet of paper and immersed in distilled water for 5 minutes. The wet strips are then tested immediately for their wet breaking load on a tensile testing machine. The test results are summarized in the following table 2.

What is claimed is:

1. A water-dispersible polyisocyanate obtained by reacting a) at least one polyisocyanate, b) at least one polyalkylene oxide polyether alcohol optionally containing ester groups, c) at least one monohydric quaternized tertiary aminopolyalkylene oxide polyether alcohol, and d) optionally, further auxiliaries and additives.

2. A water-dispersible polyisocyanate according to claim 1 wherein polyisocyanate a) is a modified polyisocyanate containing uretdione, isocyanurate, allophanate, biuret, or oxadiazine groups or combinations thereof.

3. A water dispersible polyisocyanate according to claim 1 wherein the polyisocyanate a) is a compound of the formula (II)

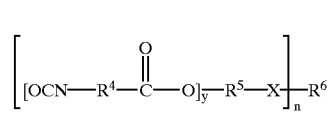

(II)

wherein $R^4$ denotes an aliphatic hydrocarbon radical having 2 to 18 carbon atoms; a cycloaliphatic hydrocarbon radical having 4 to 15 carbon atoms; an aromatic hydrocarbon radical having 6 to 15 carbon atoms, or an araliphatic hydrocarbon radical having 8 to 15 carbon atoms, $R^5$ denotes an aliphatic hydrocarbon radical which optionally contains double bonds and has 10 to 35 carbon atoms, $R^6$ denotes an at least divalent hydrocarbon radical, which can optionally be heterocyclic, including the ester oxygen or amide nitrogen from X, X denotes

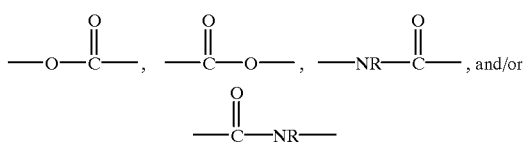

where R is H or $C_1$–$C_4$-alkyl or is a constituent of a cyclic structure, n denotes a number>2, and y denotes a number>1, or a mixture of a compound of formula (II) with isocyanates that do not contain ester and/or amide groups.

4. A water dispersible polyisocyanate according to claim 1 wherein the polyisocyanate a) is an isocyanurate, allophanate, biuret, oxadiazine, or uretdione.

5. A water dispersible polyisocyanate according to claim 1 wherein the polyalkylene oxide polyether alcohol b) is a monohydric or polyhydric polyalkylene oxide polyether alcohol containing a random average of 5 to 70 alkylene oxide units per molecule.

6. A water dispersible polyisocyanate according to claim 1 wherein the aminopolyalkylene oxide polyether alcohol c) is a compound of the formula (I)

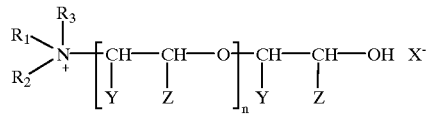

(I)

wherein n denotes an integer from 2 to 60, $R_1$ and $R_2$ are identical or different and denote an alkyl radical having 2 to 7 carbon atoms, or together, optionally also with $R_3$, denote the radical of a heterocyclic ring, $R_3$ denotes an alkyl radical having 1 to 7 carbon atoms, $X^-$ denotes an anion customary in isocyanate chemistry, Y and Z denote hydrogen or methyl, with the proviso that always at least one of Y and Z represents hydrogen, with the proviso that the recurring

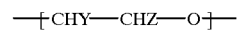

units can be identical or different from one another.

7. A water dispersible polyisocyanate according to claim 6 wherein $X^-$ is $\frac{1}{2} S^{42-}$, $I^-$, $Cl^-$, $Br^-$, $CF_3SO_3^-$, $CH_3SO_3^-$, or

8. A process for the preparation of a water-dispersible polyisocyanate comprising reacting in any sequence a) at least one polyisocyanate, b) at least one polyethylene oxide polyether alcohol optionally containing ester groups, c) at least one monohydric quaternized tertiary aminopolyalkylene oxide polyether alcohol, and d) optionally further auxiliaries and additives.

9. A process for the refinement of a cellulosic, optionally wood-containing material comprising treating said material with a water-dispersible polyisocyanate according to claim 1.

10. A cellulosic, optionally wood-containing material obtained by treating a cellulosic, optionally wood-containing material with a water-dispersible polyisocyanate according to claim 1.

11. A material according to claim 10 wherein said material is a paper.

* * * * *